United States Patent [19]

Pasin et al.

[11] Patent Number: 5,538,267
[45] Date of Patent: Jul. 23, 1996

[54] CONVERTIBLE TOY WAGON HAVING ADDITIONAL STORAGE CAPACITY

[75] Inventors: Mario A. Pasin, Hinsdale; Roger Tonelli, Elmwood Park, both of Ill.; James B. Easley, Minneapolis, Minn.

[73] Assignee: Radio Flyer Inc.

[21] Appl. No.: 323,253

[22] Filed: Oct. 14, 1994

[51] Int. Cl.$^6$ ............................................. B62B 3/02
[52] U.S. Cl. .............................. 280/87.01; 280/47.35; 280/47.36; 296/37.4
[58] Field of Search ............... 280/87.01, 87.021, 280/47.34, 47.35, 47.38, 47.36; 296/180, 37.4, 37.6

[56] References Cited

U.S. PATENT DOCUMENTS

| | | | |
|---|---|---|---|
| 663,526 | 12/1900 | White | 280/87.01 |
| 1,771,813 | 7/1930 | Norman | 280/87.01 |
| 5,380,023 | 1/1995 | McBee | 280/87.01 |

Primary Examiner—Richard M. Camby
Attorney, Agent, or Firm—Rockey, Rifkin & Ryther

[57] ABSTRACT

The convertible wagon of the invention includes a handle that can be pivotably attached to a latch assembly on the front of the wagon body or can be snapped in an upright position into a locking assembly on the back wall of the wagon. The wagon can be pulled when the handle is attached to the latch assembly and can be pushed when the handle is snapped into the locking assembly. A removable panel separates passenger and storage compartments within the wagon body.

17 Claims, 8 Drawing Sheets

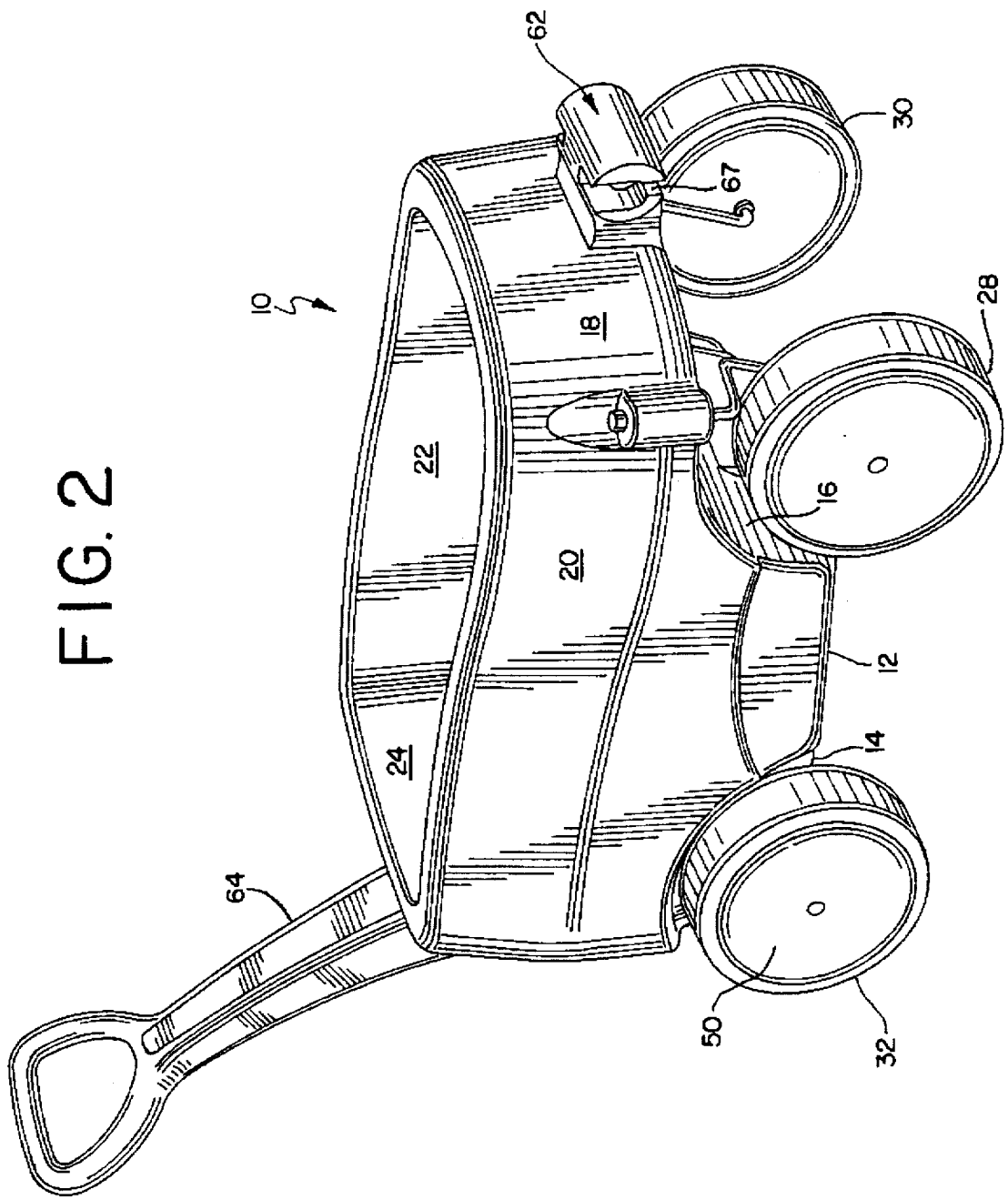

CONVERTIBLE TOY WAGON HAVING ADDITIONAL STORAGE CAPACITY

BACKGROUND OF THE INVENTION

The present invention relates generally to toy wagons and, more particularly, to a convertible toy wagon having additional storage and cargo carrying capacity.

Typically, toy wagons include a body portion having a planar bottom portion and an integrally formed wall extending upwardly from the bottom portion to form a passenger compartment for carrying a child or other cargo. Front and back wheel assemblies support the wagon body and provide rolling contact with the ground. Typical front wheel assemblies include a pair of wheels rotatably supported on an axle which is mounted to the wagon body for pivotal movement. The back wheel assembly comprises a pair of wheels rotatably supported on an axle which is fixed to the rear portion of the wagon body. The front wheel assembly is pivoted to steer the wagon.

Conventional wagon designs provide a steering handle that is fixed to the front wheel assembly allowing children or cargo to be pulled in the passenger compartment. While such designs are suitable for their intended uses of carrying children or cargo, multiple compartments defined in a single wagon body that can be moved by pushing as well as pulling are preferred.

Accordingly, it is desirable to provide a toy wagon having a storage compartment in addition to a passenger compartment defined in the wagon body which can either be pushed or pulled by the wagon operator.

SUMMARY OF THE INVENTION

The convertible toy wagon of the invention provides the desired features by utilizing a handle which can be pivotably attached to a latch assembly on the front of the wagon body allowing the wagon to be pulled. Also, the handle can be attached in an upright position to a locking assembly positioned on the back wall of the wagon allowing it to be pushed. A storage compartment is defined below the passenger compartment by a downwardly extending wall that is integral with the upstanding wall. A removable panel in the planar bottom portion of the passenger compartment separates the storage compartment from the passenger compartment.

The wagon can be configured as a stroller when the handle is positioned in the locking assembly. The flat bottom configuration may then support a child in a lying or sitting position or the bottom panel may be removed thereby allowing a child to sit upright in the passenger compartment. In this case, the storage compartment is used as a footwell for the child. The wagon can easily be converted to a conventional "pull-type" wagon configuration by replacing the removable panel, removing the handle from the locking assembly and pivotably attaching it to the latch assembly. The storage compartment provides ample storage.

DESCRIPTION OF THE DRAWINGS

FIG. 2 shows a perspective view of the wagon of FIG. 1 configured as a stroller.

DESCRIPTION OF THE INVENTION

Figure 1:
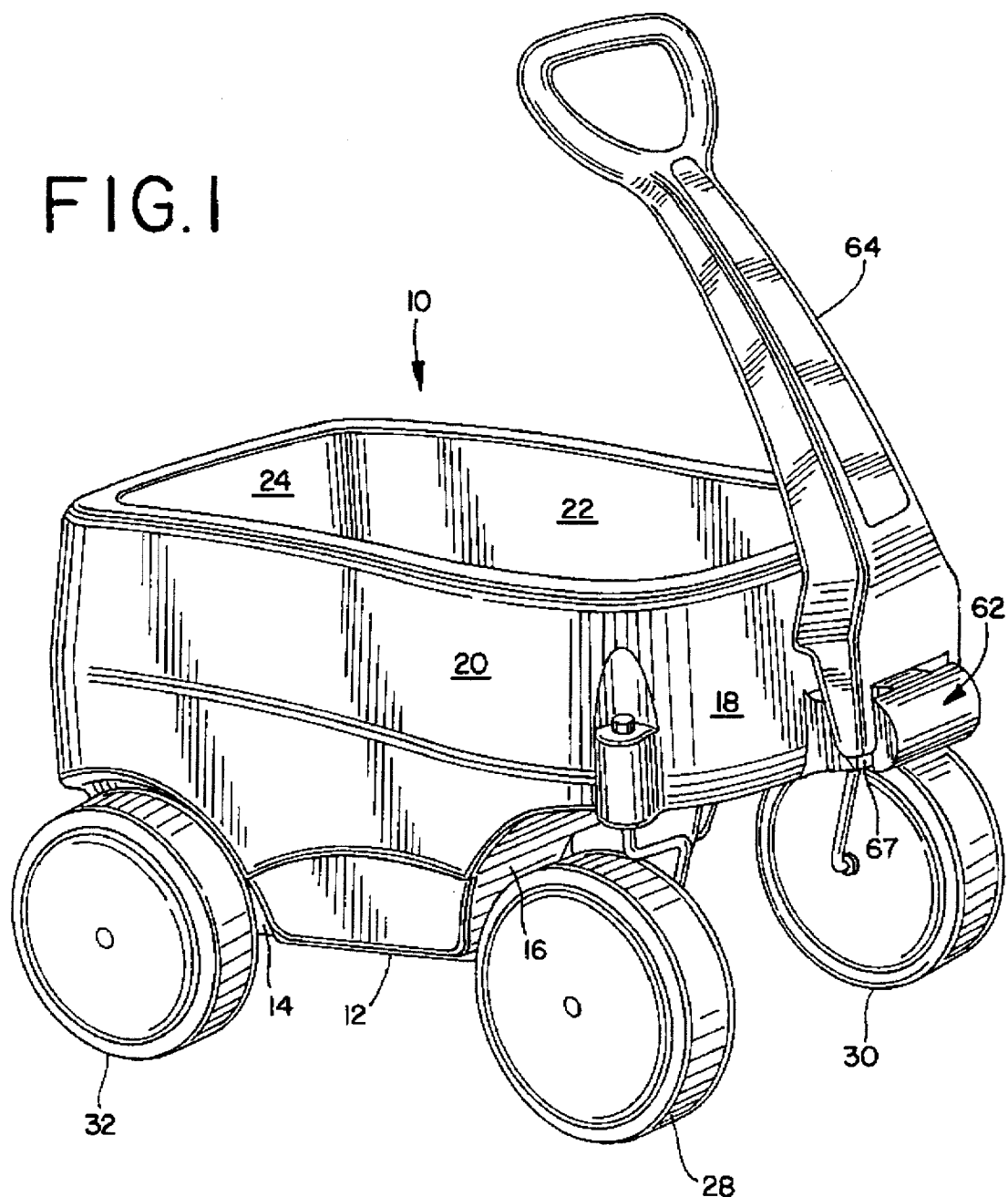
FIG. 1 shows a perspective view of the convertible toy wagon of the invention.
Figure 4:
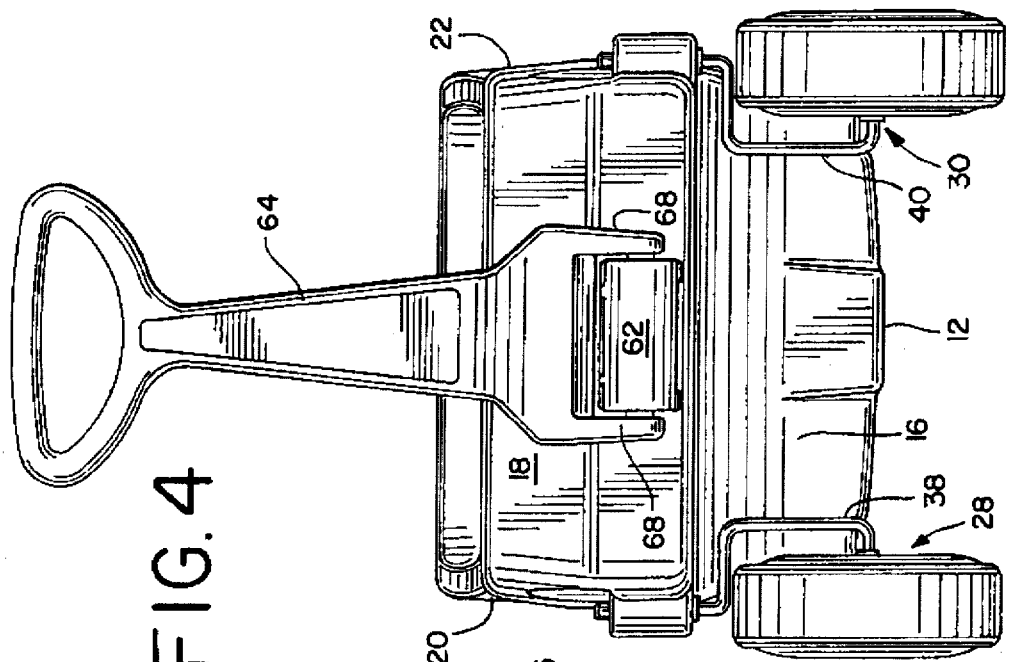
FIGS. 3, 4, 5, 6 and 7 show side, front, top, bottom and back views of the wagon of FIG. 1.
Figure 3:
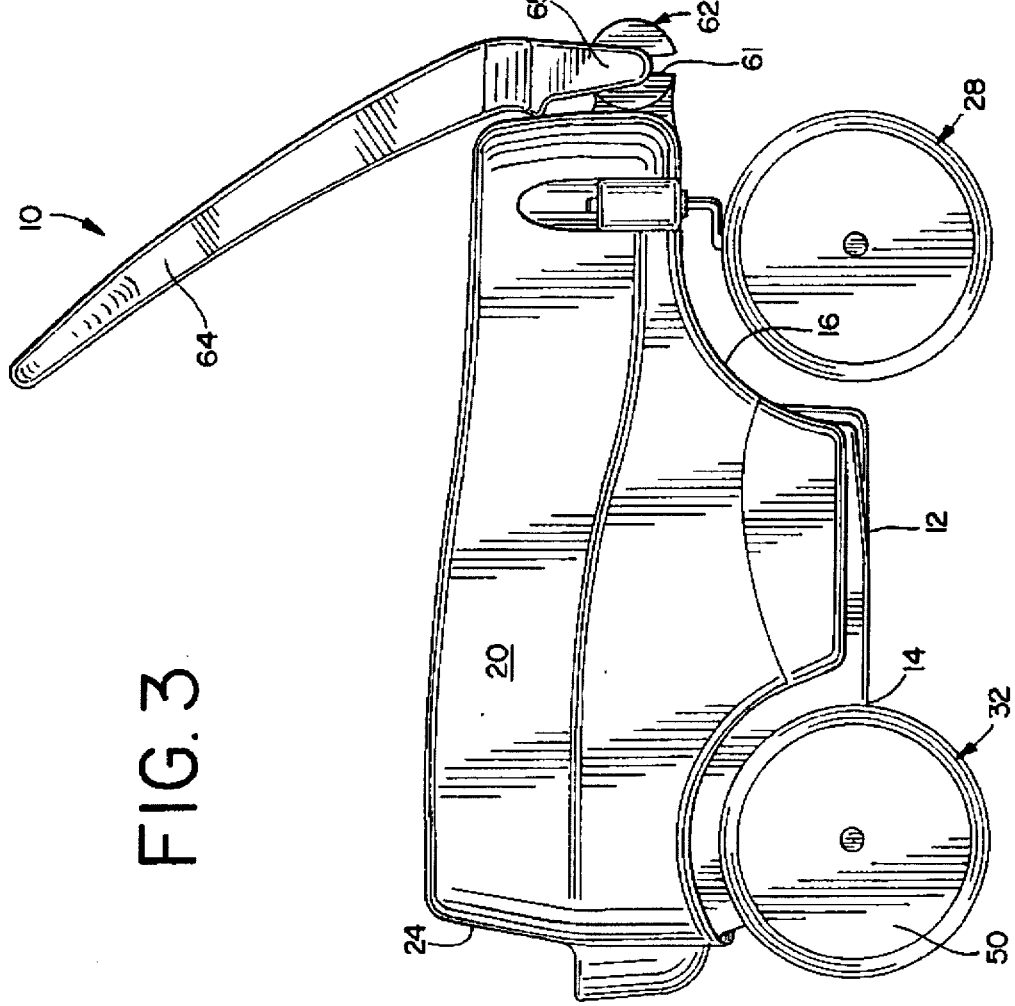
Figure 9:
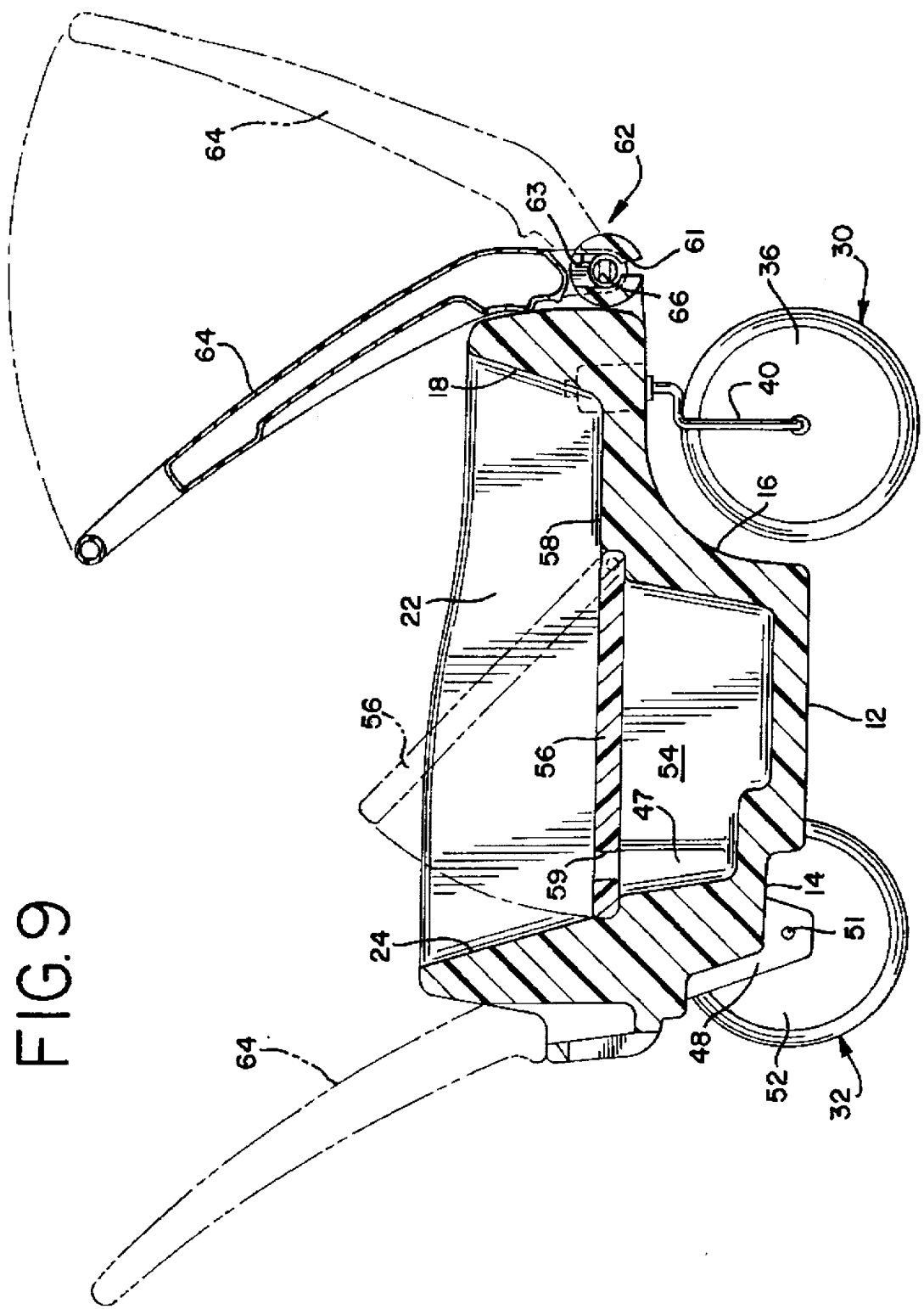
FIG. 9 shows a side cross-sectional view of the wagon of FIG. 1.

FIG. 1 shows a perspective view of the convertible top wagon 10 which is best illustrated in FIGS. 1 and 9. Wagon 10 comprises a body portion which includes a bottom wall 12 having a back portion 14 and a curved front portion 16. Front wall 18, side walls 20 and 22 and back wall 24 are integral with and upwardly extend from bottom wall 12 to define a passenger compartment.

Figure 8:
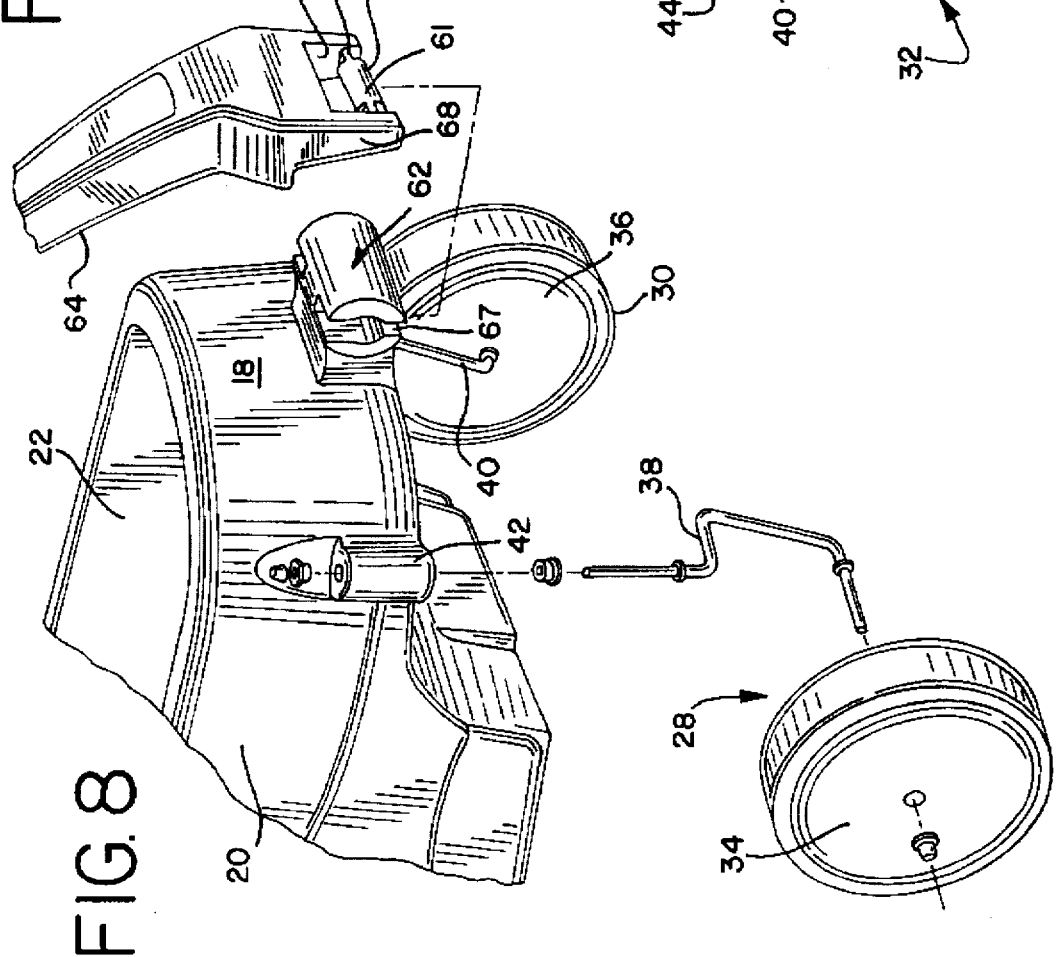
FIG. 8 shows an exploded view of the front latch and the front wheel assemblies of the wagon of FIG. 1.

The body portion is supported on a pair of front wheel assemblies 28 and 30 and a rear wheel assembly 32 which provide rolling engagement with the ground. As best shown in FIG. 8, the front wheel assemblies 28 and 30 include wheels 34 and 36 which are rotatably mounted on moveable axles 38 and 40. Axles 38 and 40 are pivotably connected to the wagon body portion at the juncture of the side walls 20 and 22 with front wall 18 in axle receivers 42 and 44. Thus, wheels 34 and 36 freely rotate about axles 38 and 40 which freely pivot in receivers 42 and 44. The curved portion 16 of bottom wall 12 further allows the wheels 34 and 46 to rotate 360 degrees allowing the wagon to be easily steered.

Figure 6:
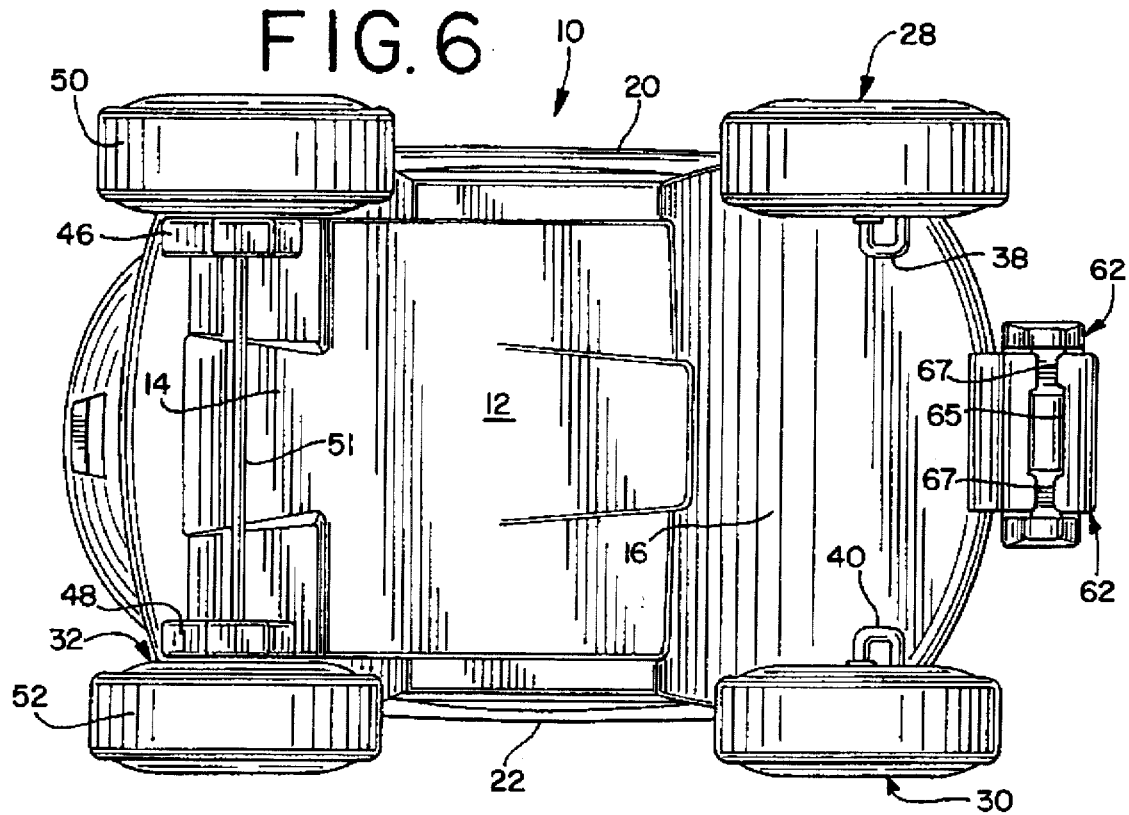
Figure 7:
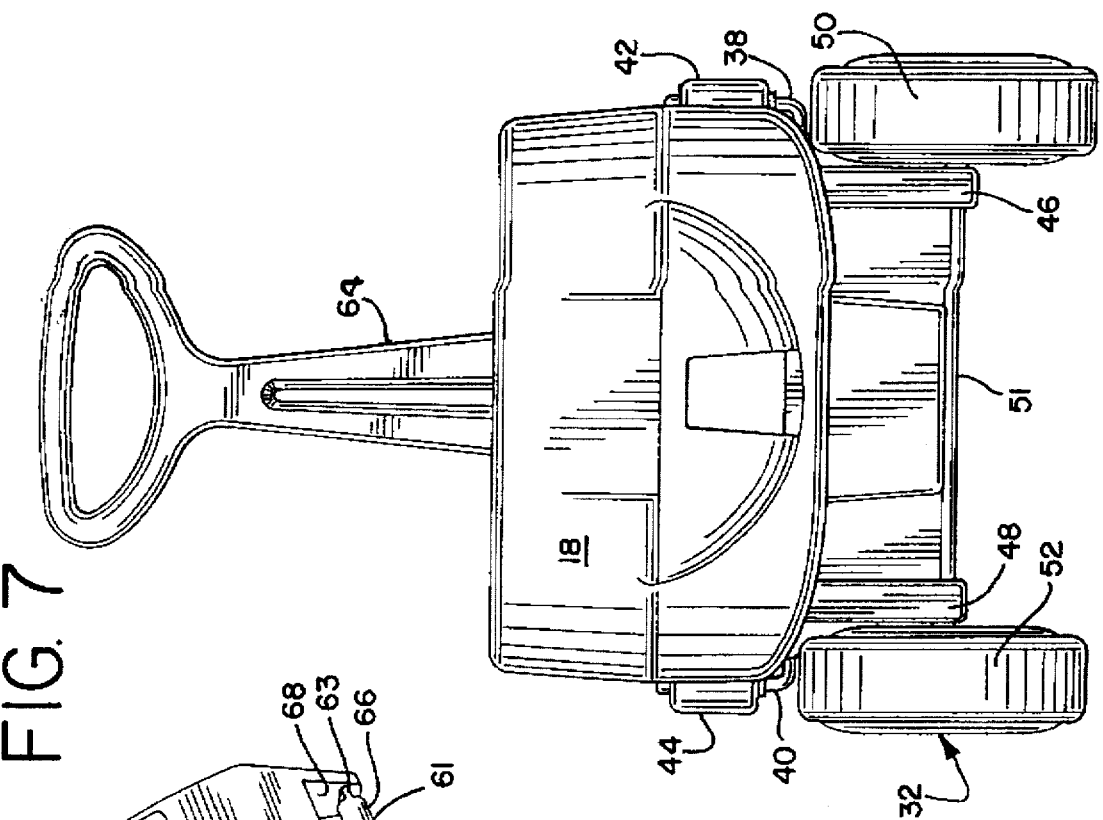

Rear wheel assembly 32, best shown in FIGS. 6, 7 and 9, includes a pair of supports 46 and 48 which downwardly extend from the back portion 14 of bottom wall 12. Rear wheels 50 and 52 are rotatably mounted on rear axle 51 which extends through a pair of apertures in supports 46 and 48.

Figure 5:
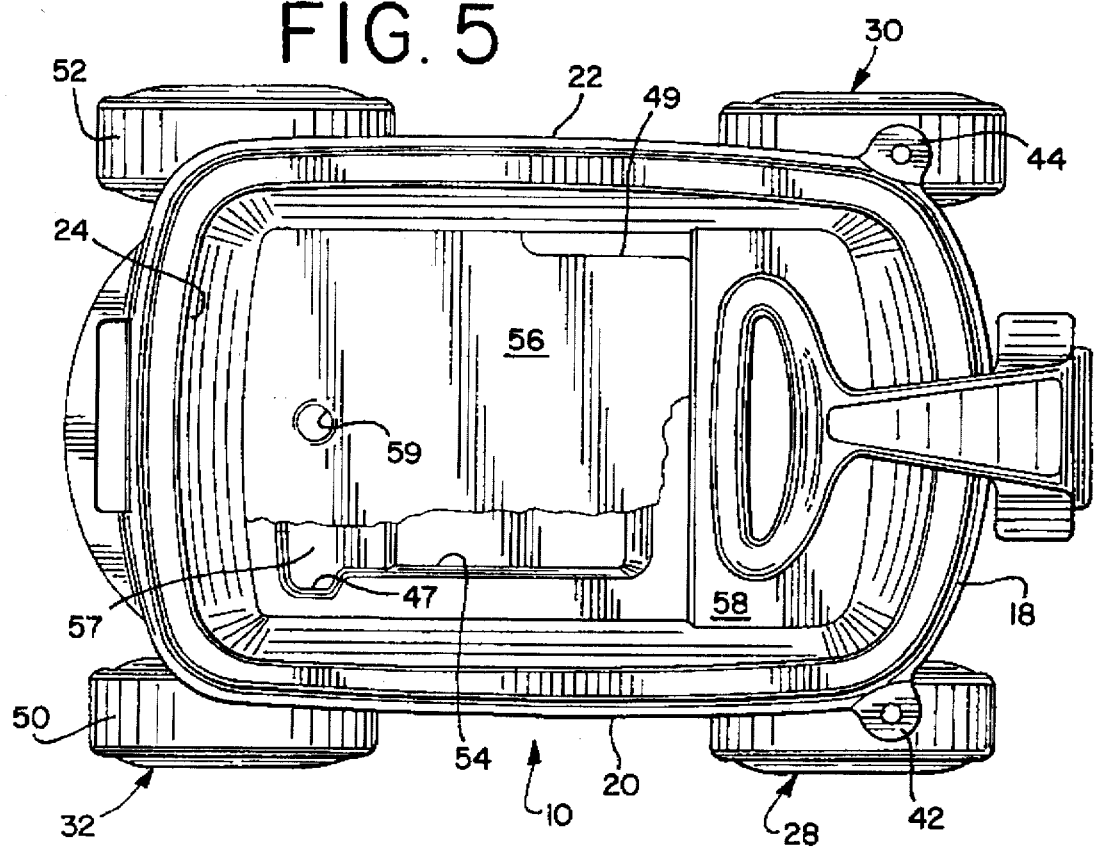

The wagon body and handle are preferably molded from high density polyethylene or some similar material used for children's products. In the configuration shown, particularly in FIGS. 5 and 9, a deep body is molded leaving considerable space between bottom wall 12 and the top edges of the side, front and rear walls. A storage compartment 54 can then be provided by resting cover 56 on peripheral surfaces 55. A finger hole opening 59 may be used for removing the cover. With cover 56 removed, horizontal surface 58 could be used as a seat and the compartment 54 as a footwell.

Opposed vertical grooves 47 are formed in the side walls 20 and 22 at the rear of the compartment 54. The cover 56 is configured with side edge portions 49 which are spaced apart a distance permitting receipt within the grooves. Accordingly, the cover 56 can be stored upright in the vehicle as shown in phantom in FIG. 2.

The wagon is adapted to be propelled by a handle 64 which may be attached to the front wall 18 as best illustrated in FIGS. 1, 6, 8, 9 and 10. The handle includes spaced distal end portions 68 with connector bar 66 extending therebetween. The connector includes enlarged central portion 61 and reduced thickness end portions 63.

A latch 62 is formed on the front wall 18 for receiving the handle end. As best shown in FIG. 6, this latch defines a bottom channel having a large central section 65 dimensioned for receiving the central portion 61, and narrower end portions 67 dimensioned for receiving the portions 63. It will be noted, however, that the portions 63 must be aligned properly with the portions 67 for entry and removal. This alignment is preferably achieved only when the handle is in the dotted line position of FIG. 9 so that the handle cannot be accidentally pushed out by someone standing, kneeling or sitting in the wagon.

Figure 10:
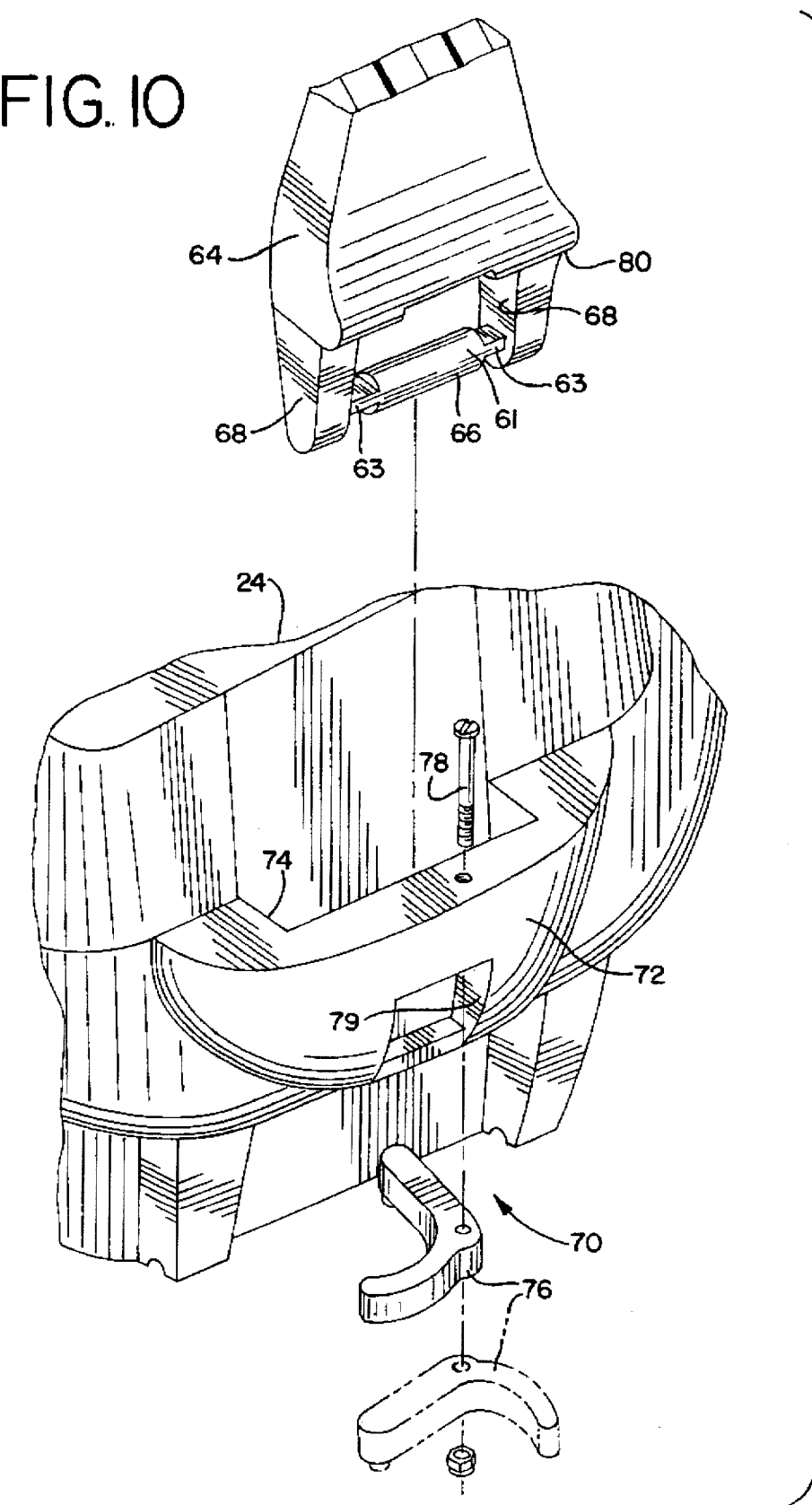
FIG. 10 shows an exploded view of the locking assembly on the back wall of the wagon of FIG. 1.

FIG. 10 illustrates an exploded view of the locking assembly 70 that is used to lock handle 64 in an upright position on the back of the wagon 10. The locking assembly 70 includes a pocket 72 that is formed in the back wall 24 of the wagon and has a receiving well 74 defined therein. A lock arm 76 is rotatably attached to pocket 72 and pivots about screw 78 in a cutout 79 in the front face of pocket 72. Lock arm 76 pivots within well 74 from a handle locking position shown in solid line to an open position shown in phantom in FIG. 10.

Figure 11A:
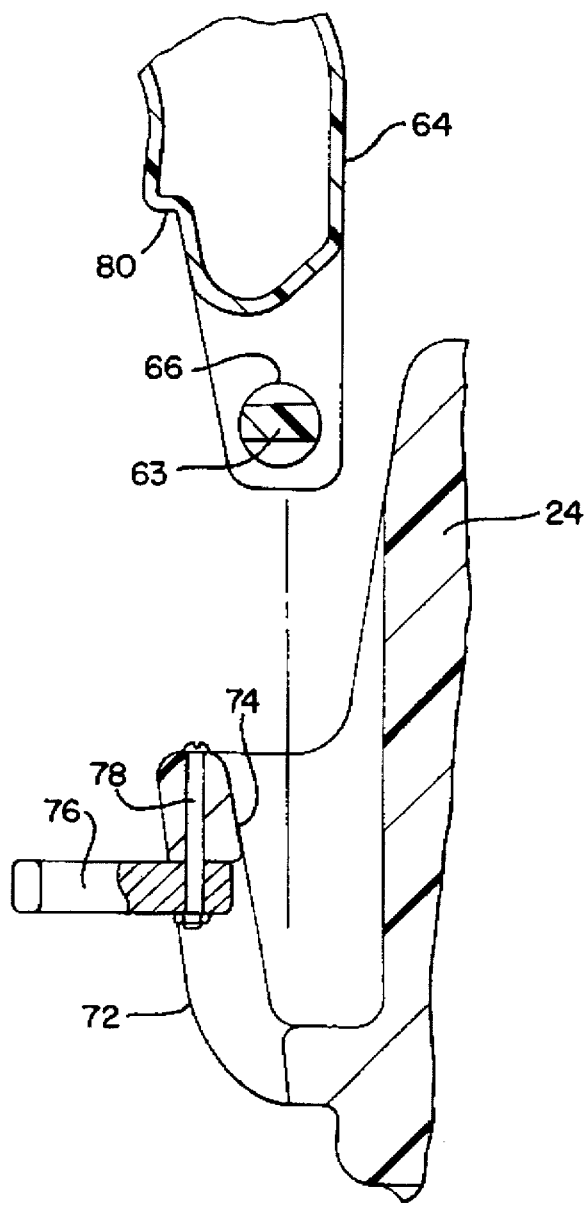
FIGS. 11A and 11B show side cross-sectional views of the locking assembly of the wagon of FIG. 1 in open and locked conditions.
Figure 11B:
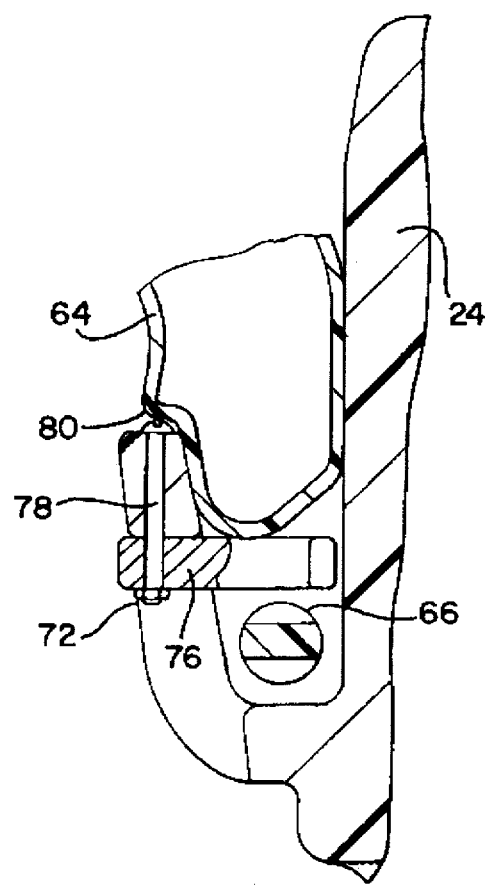

FIG. 11A illustrates a side cross-sectional view of the locking assembly 70 where lock 76 is open. Handle 64 is inserted into receiving well 74 of pocket 72 until its lip 80 abuts the top surface of pocket 72. When handle 64 is inserted into well 74, lock arm 76 can be rotated to the closed position shown in FIG. 11B to securely lock the handle 64 in the upright position best illustrated in FIG. 2.

When handle 64 is locked into the receiving well 74 in an upright position it allows the wagon 10 to be pushed. Thus, with the handle in the position of FIG. 2, the wagon 10 is configured as a stroller providing upright seating for a child or, if the cover 56 is left in place, providing a flat bed for a child to sit or lie on with a storage compartment 54 positioned below the passenger compartment.

When the handle 64 is inserted into the front latch 62, wagon 10 can be pulled and a child can use the flat bed configuration with cargo placed in the storage compartment or the cover 56 could be removed to provide a seat.

While the invention has been illustrated and described in detail in the drawings and the foregoing description, the same is to be considered as illustrative and not restrictive in character, it being understood that only the preferred embodiment has been shown and described and that all changes and modifications that come within the spirit of the invention are desired to be protected.

What is claimed is:

1. An improved toy wagon including a handle, a planar bottom portion and an upstanding wall having a perimeter defined by front, back and two side portions to define a passenger compartment, the improvement comprising:
   a) a downwardly extending wall integral with said upstanding wall having a perimeter defined by front, back and two side portions to define a storage compartment beneath said passenger compartment;
   b) a seat defined in the planar bottom portion of said wagon;
   c) a removable panel disposed in said seat for allowing access to the storage compartment;
   d) latch means for removably and pivotably attaching said handle to the front of said wagon to allow the wagon to be pulled; and
   e) lock means for removably attaching said handle in an upright position to the back of said wagon to allow the wagon to be pushed.

2. The improved toy wagon of claim 1 wherein said latch means includes a receiving channel defined at the front of said wagon and a connector bar formed at the distal end of the handle receivable in said channel so that said handle can be vertically pivotally attached at said front.

3. The improved toy wagon of claim 1 wherein said lock means includes a well having a cutout on its outer surface for receiving said handle.

4. The improved toy wagon of claim 1 wherein said lock means also includes a lock arm pivotably attached to the well, said lock arm being rotatable in said cutout from an open position to a handle locking position.

5. The improved toy wagon of claim 1 wherein the interior volume defined by the storage compartment is smaller than that of the passenger compartment.

6. A convertible toy wagon comprising:
   a) a wagon body having front and back portions, a planar bottom portion and an upstanding wall having a perimeter defined by front, back and two side portions to define a passenger compartment;
   b) a handle;
   c) latch means for removably and pivotably attaching said handle to the front of said wagon to allow the wagon to be pulled; and
   d) lock means for removably attaching said handle in an upright position to the back of said wagon to allow the wagon to be pushed.

7. The convertible toy wagon of claim 6 wherein said latch means includes a receiving channel defined at the front of said wagon and a connector bar formed at the distal end of the handle receivable in said channel so that said handle can be vertically pivotally attached at said front.

8. The convertible toy wagon of claim 7 wherein said channel faces downwardly whereby said connector bar must be moved upwardly for receipt within the channel, and means for securing the connector bar against release from the channel.

9. The convertible toy wagon of claim 6 wherein said lock means includes a well having a cutout on its outer surface attached to the back of the wagon for receiving the distal portion of said handle.

10. The convertible toy wagon of claim 9 wherein said lock means also includes a lock arm pivotably attached to the well, said lock arm being rotatable in said cutout from an open position to a handle locking position.

11. A children's wagon comprising a wagon body having a bottom wall and upstanding front, back and side walls, a passenger compartment defined within said walls, a storage compartment defined by said bottom wall and communicating with said passenger compartment, said storage compartment extending longitudinally a substantial distance less than the longitudinal extent of said bottom wall whereby at least one bottom wall area is located adjacent said compartment, a cover for placement over said storage compartment, said cover being adapted for opening to provide access to the storage compartment, said storage compartment being available for storage of goods with the cover in place over the storage compartment, and said storage compartment providing a footwell for a child when the cover is opened, whereby the child's feet are positioned in the footwell while said bottom wall area provides support for the child sitting in the wagon.

12. The wagon of claim 11 wherein the interior volume defined by the storage compartment is smaller than that of the passenger compartment.

13. A wagon according to claim 11 wherein said cover forms part of the bottom wall of the passenger compartment when the cover is in place.

14. A children's wagon comprising a wagon body having a bottom wall and upstanding front, back and side walls, a passenger compartment defined within said walls, a storage compartment defined by said bottom wall and communicating with said passenger compartment, a cover for placement over said storage compartment, said cover being adapted for opening to provide access to the storage compartment, said storage compartment being available for storage of goods with the cover in place over the storage compartment, and said storage compartment providing a footwell for a child when the cover is opened, said cover forming part of the bottom wall of the passenger compartment when the cover is in place, and wherein a bottom wall area adjacent said storage compartment provides seating support for a child when the storage compartment is used as a footwell.

15. A children's wagon comprising a wagon body having a bottom wall and upstanding front, back and side walls, a passenger compartment defined within said walls, a storage compartment defined by said bottom wall and communicating with said passenger compartment, a cover for placement over said storage compartment, said cover being adapted for opening to provide access to the storage compartment, said storage compartment being available for storage of goods with the cover in place over the storage compartment, and said storage compartment providing a footwell for a child when the cover is opened, a handle for said wagon, and means for positioning the handle selectively at the front or back of the wagon to permit either pushing or pulling of the wagon.

16. A wagon according to claim 11 including means for retaining said cover in the wagon when the cover is opened.

17. A wagon according to claim 16 wherein said cover is disposed in a substantially vertical position when the cover is opened and retained in the wagon.

* * * * *